UNITED STATES PATENT OFFICE.

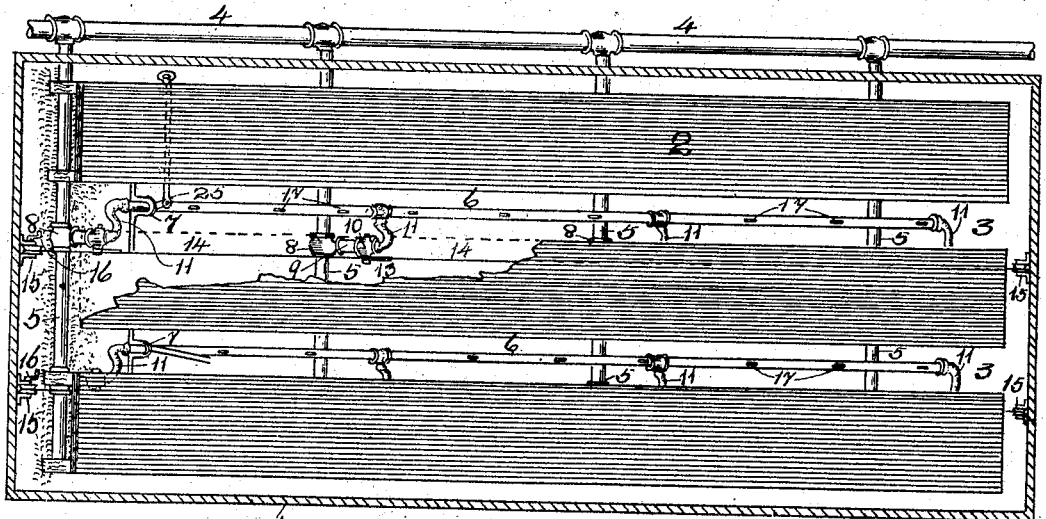
Fig. 1.
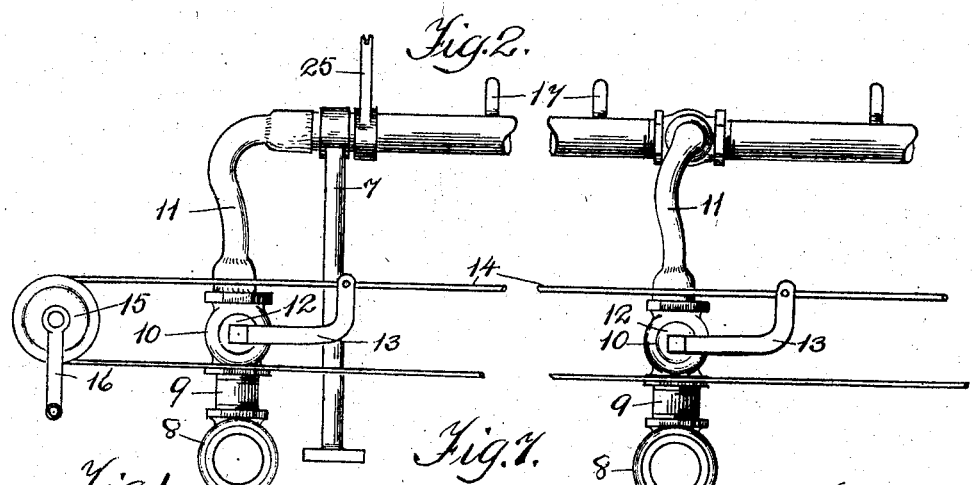
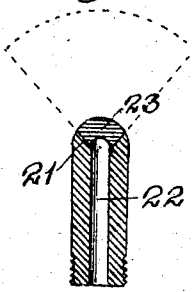
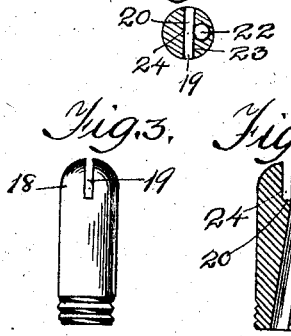
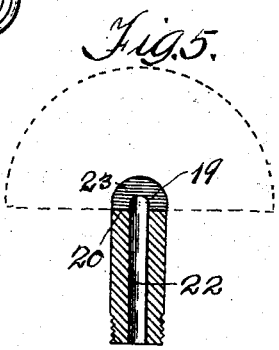

LOUIS WITTBOLD, OF CHICAGO, ILLINOIS.

WATERING SYSTEM AND NOZZLE FOR GREENHOUSES.

No. 796,027.          Specification of Letters Patent.          Patented Aug. 1, 1905.

Application filed March 11, 1905. Serial No. 249,675.

*To all whom it may concern:*

Be it known that I, LOUIS WITTBOLD, a citizen of the United States, residing at Chicago, in the county of Cook and State of Illinois, have invented certain new and useful Improvements in Watering Systems and Nozzles for Greenhouses, of which the following is a specification.

The system and nozzle of this invention are intended more particularly for use in greenhouses, in which the plants are arranged on parallel raised benches separated from one another by aisles or passages; and the object of the invention is to provide means for simultaneously watering entire rows of plants by a spray of water projected at a suitable angle with respect to the benches.

Another object of the invention is to provide means for properly controlling the supply of water so as to project a uniform sheet of water along the entire length of a bench and to provide adjusting means for properly directing the sheet of water at will.

Another object of the invention is to so construct and arrange the discharging-nozzles that a broad fan-shaped sheet of water will be projected, and the nozzles are so arranged that the sheet of water will be continuous throughout the entire length of the bench.

The invention consists in the features of construction and the combination of parts hereinafter described and claimed.

In the drawings illustrating the invention, Figure 1 is a plan view of a greenhouse, showing the system installed; Fig. 2, an enlarged detail showing the method of operating the valves for controlling the supply of water; Fig. 3, a side elevation of the nozzle of the present invention; Figs. 4 and 5, sectional elevations of the same; Fig. 6, a slightly-modified form of nozzle, and Fig. 7 a cross-section of the nozzle of Figs. 3 and 4.

The system as shown is installed in a greenhouse 1 of suitable size and shape, within which, as shown, is arranged a series of three benches 2, having between them aisles or passages 3, although the shape, number, and arrangement of the benches can be infinitely varied to suit the requirements of each particular case. The water for operating the system is obtained from a main header-pipe 4, which is shown as located outside of the greenhouse and may be the city water-main or other suitable source of supply, and from the main extend a series of cross-headers 5, which pass transversely under the adjoining benches, and along the aisles or passages between the benches extend discharging-pipes 6, which are of sufficient length to extend substantially the entire length of the benches, and said discharging-pipes are mounted in any suitable way to allow them to turn or rock back and forth. As shown, the discharge-pipes are mounted in bearings 7, although they might be suspended from the ceiling of the greenhouse or laid upon the floor thereof, depending upon the vertical elevation at which it is desirable to locate the pipes. The cross-headers have located therein T-couplings 8, one for each of the discharge-pipes, from which couplings project short sections of pipe 9, terminating in valves 10, to which valves are secured flexible hose-pipes 11 or other flexible connections, which are secured to the discharge-pipes at their ends and at suitable points intermediate thereof, so as to supply water uniformly to all portions of the discharge-pipes. The valves 10 are provided with valve-plugs 12, which are adapted to be turned by means of bent arms 13, and the arms of all the valves adapted to supply the same discharging-pipe are connected together by means of a cable 14, which extends longitudinally of the greenhouse and passes over pulley-wheels 15, secured to the ends of the greenhouse or other suitable supports, and one or both of the pulley-wheels, as shown, are provided with handles 16 for moving the cable to simultaneously open or close all of the valves supplying water to a single discharge-pipe.

The discharge-pipes have inserted thereinto at suitable intervals a series of nozzles 17, each of the nozzles being provided at its discharge end 18 with a slot 19, and the slots can be cut completely across the discharge end of the nozzle to leave straight edges 20, as shown in Fig. 5, or can be cut to provide outwardly-diverging edges 21, as shown in Fig. 6. When the edges are cut straight, as shown in Fig. 5, the water will be directed laterally to a greater extent than when the edges are sloped, as shown by dotted lines in Figs. 5 and 6. The nozzle of each type is provided on its interior with a bore 22, which opens through one of the side walls 23 of the slot in the nozzle, which may be termed the "discharge" side wall, and the water discharged therefrom strikes against the opposite side wall 24, which may be termed the "deflecting" side wall, and the bore in the nozzle is of considerable less diameter than the bore in the discharge-pipe, so that the water passing through the nozzle will be projected with great force against the deflecting side wall and be discharged in a fan-shaped sheet, and the nozzles are spaced a suitable distance to have the sheet of water from one nozzle overlap the sheet of water from the next adjoining nozzle, so that a continuous thin sheet of water will be delivered from end to end of the discharge-pipe. The discharge-pipe may be rocked or turned by means of a lever 25 or any other suitable means.

In use the plants are placed on the benches so that their foliage overhangs the open aisles or passages between the benches, and when it is desirable to water the plants the discharge-pipes are turned or rocked so that the entire series of nozzles will be pointed toward the foliage, after which the cable controlling the water-supply can be moved to simultaneously open all of the valves, thereby equally supplying all portions of the discharge-pipe, which will project a continuous, broad, thin sheet of water from the nozzles upon the foliage of the plants. The operation of the water-discharge pipe can be regulated by a single person at a suitable point to escape the discharged water, and an entire bench of plants can be readily watered in a very short space of time. By rocking the discharge-pipe back and forth the sheet of water can be suitably directed first to one side of the aisle or passage-way and then to the other side, so that a single discharge-pipe will serve to water all of the plants on both sides of the aisle or passage-way. Where it is desirable to water the plants from above, the operation of the device is similar in every respect to that hitherto described, and the method of supplying water through the discharge-pipe through the medium of the flexible hose is one which enables the discharge-pipe to be readily moved to meet the requirements in each particular case. Where the benches are low and the foliage of the plants near the ground, the discharge-pipe can be laid thereon and rocked without difficulty, and if the foliage is elevated at a considerable height above the ground the discharge-pipes can likewise be elevated and the flexible connection can be of sufficient length to accommodate a considerable change in the vertical elevation of the discharge-pipes.

The nozzles herewith employed are designed to effect a wide lateral discharge of a thin sheet of water, which is deflected by the contact of the projected stream against the deflecting side wall of the slotted opening in the nozzle, the stream being projected against the side wall of the slot and not directly through the slot, as is ordinarily the case. This method of forming the nozzles enables them to be manufactured at an extremely low cost, since the entire nozzle requires but two cuts to complete it, and the effect is one which is very satisfactory for the class of work for which it is designed.

What I regard as new, and desire to secure by Letters Patent, is—

1. In a watering system, a nozzle having in its end an inwardly-extending slot leaving companion outwardly-extending side walls and having a bore opening through one of the side walls of the slot, and adapted to project water directly against the opposite side wall for laterally deflecting the water and discharging the same, substantially as described.

2. In a watering system, a nozzle having in its end an inwardly-extending slot leaving companion side walls having smooth parallel faces leaving a space between the walls open at the sides and outer end of the nozzle and a bore opening through one of the side walls of the slot in line with the face of the companion wall and adapted to project water directly against the opposite companion wall for laterally projecting the water and discharging the same, substantially as described.

3. In a watering system for greenhouses, the combination of two benches, leaving an aisle or passage-way between the benches, a longitudinally-extending discharge-pipe located between the benches and mounted to rock or oscillate a plurality of cross header-pipes extending transversely of the benches, a plurality of hose connections between the cross-headers and discharge-pipe, a plurality of valves controlling the flow of water through the flexible connections, means for simultaneously operating all of the valves, means for rocking or oscillating the discharge-pipe to direct water toward either one of the benches, and a series of nozzles on the discharge-pipe, adapted to discharge a broad, continuous sheet of water from end to end of the benches, substantially as described.

4. In a watering system for greenhouses, the combination of two parallel benches, leaving an aisle or passage between the benches, a longitudinally-extending main header-pipe, a plurality of cross header-pipes extending transversely of the benches, a discharge-pipe mounted to rock on its axis and extending longitudinally of the benches, a plurality of flexible connections leading from the several cross-headers to the longitudinally-extending discharge-pipe, a valve for each of the flexible connections, a connection for simultaneously operating all of the valves and a plurality of discharge-nozzles adapted to discharge a continuous, broad, thin sheet of water, substantially as described.

LOUIS WITTBOLD.

Witnesses:
SAMUEL W. BANNING,
WM. P. BOND.